US012711738B2

(12) United States Patent
Zhang et al.

(10) Patent No.: US 12,711,738 B2
(45) Date of Patent: Aug. 18, 2026

(54) REAL-TIME MEDIA ALTERATION USING GENERATIVE TECHNIQUES

(71) Applicant: PayPal, Inc., San Jose, CA (US)

(72) Inventors: Jiyi Zhang, Singapore (SG); Zhe Chen, Singapore (SG); Jiazheng Zhang, Singapore (SG); Solomon kok how Teo, Singapore (SG); Yuzhen Zhuo, Singapore (SG); Quan Jin Ferdinand Tang, Singapore (SG)

(73) Assignee: PayPal, Inc., San Jose, CA (US)

( * ) Notice: Subject to any disclaimer, the term of this patent is extended or adjusted under 35 U.S.C. 154(b) by 217 days.

(21) Appl. No.: 18/512,007

(22) Filed: Nov. 16, 2023

(65) Prior Publication Data

US 2025/0166350 A1 May 22, 2025

(51) Int. Cl.
*G06V 10/764* (2022.01)
*G06F 16/954* (2019.01)

(52) U.S. Cl.
CPC .......... *G06V 10/764* (2022.01); *G06F 16/954* (2019.01)

(58) Field of Classification Search
CPC ............................ G06F 16/954; G06V 10/764
See application file for complete search history.

(56) References Cited

U.S. PATENT DOCUMENTS 9,361,385 B2 * 6/2016 Mukherjee ............ G06Q 30/02
10,685,265 B2 * 6/2020 Sewak .................. G06N 3/045
11,595,291 B2 2/2023 Chen
11,606,367 B2 3/2023 Chen
11,610,582 B2 3/2023 Cavallari et al.
11,636,486 B2 4/2023 Chen
11,741,139 B2 8/2023 Zhuo et al.
2019/0012568 A1 * 1/2019 Kumar .................... G06N 3/09
2019/0205946 A1 * 7/2019 Mellina .................. G06N 3/084
2019/0258895 A1 * 8/2019 Sacheti .................. G06V 40/10
2019/0362154 A1 * 11/2019 Moore .................. G06V 20/46
(Continued)

FOREIGN PATENT DOCUMENTS

WO 2021102126 A1 5/2021
WO 2023272594 A1 1/2023
(Continued)

*Primary Examiner* — Vu Le
*Assistant Examiner* — Jessica Yifang Lin
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed for generating an altered version of an original version of media using a generative model. A system detects, at a computing device, a trigger event indicating a user of the computing device has requested to view media at a user interface of the computing device. In response to detecting the trigger event, the system: retrieves, an original version of the media from a backend server and identifies, using an object detection model, a bounding region of content within the original version, generates, using a generative model, an altered version of the media based on the bounding region, and transmits to the computing device, the altered version for display at the computing device in place of the original version, where the generative model generates the altered version of the media based on historical transaction information and user information of the user of the computing device.

20 Claims, 7 Drawing Sheets

(56) References Cited

U.S. PATENT DOCUMENTS

2021/0329320 A1* 10/2021 Triantafyllou ....... H04N 21/812
2021/0350516 A1 11/2021 Tang et al.
2022/0044244 A1 2/2022 Chen
2022/0051125 A1 2/2022 Ho et al.
2022/0086147 A1 3/2022 Chen et al.
2022/0318597 A1 10/2022 Yu et al.
2022/0358289 A1 11/2022 Chen et al.
2023/0084532 A1 3/2023 Chen et al.
2023/0095320 A1 3/2023 Zhang et al.
2023/0186685 A1 6/2023 Zhang et al.
2023/0196527 A1 6/2023 Zhang
2023/0290344 A1 9/2023 Cavallari et al.

FOREIGN PATENT DOCUMENTS

WO WO-2023107748 A1 * 6/2023 ........... G06Q 30/018
WO 2023158949 A1 8/2023

* cited by examiner

Example Binary Image 502
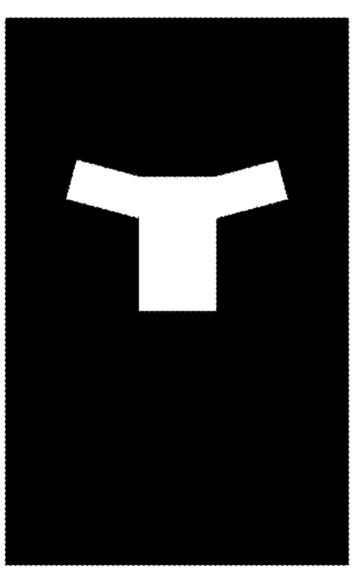
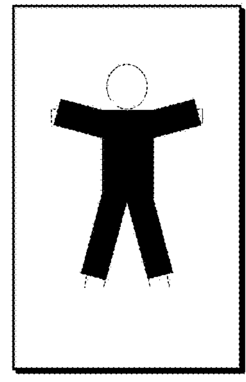
Altered Image 504A
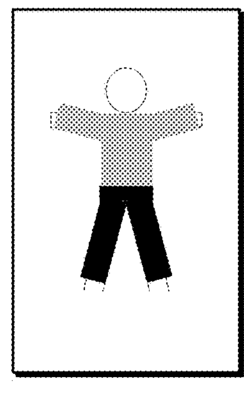
Altered Image 504B
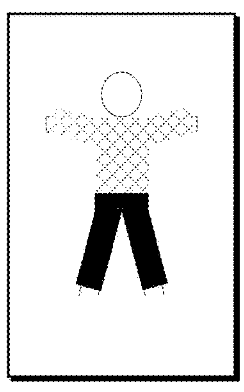
Altered Image 504C
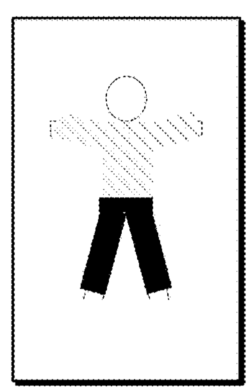
Altered Image 504D
*Fig. 5*

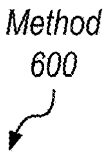

Detect, at a computing device, a trigger event indicating that a user of the computing device has requested to view media at a user interface of the computing device.
610

In response to detecting the trigger event:

Retrieve, from a backend server, an original version of the media indicated by the trigger event.
620

Identify, using an object detection model, a bounding region of a portion of content with the original version of the media.
630

Generate, using a generative model, an altered version of the media based on the identified bounding region, where the generative model generates the altered version of the media based on historical transaction information and user information of the user of the computing device.
640

Transmit, to the computing device, the altered version of the media for display at the user interface of the computing device in place of the original version of the media.
650

Fig. 6

REAL-TIME MEDIA ALTERATION USING GENERATIVE TECHNIQUES

BACKGROUND

Technical Field

This disclosure relates generally to altering media, and, more specifically, to techniques for training a generative model to alter media in real-time in response to, for example, an end user requesting to view the media.

Description of the Related Art

As more and more content is available online, some of this content may be undesirable or inappropriate for certain audiences. Many online platforms implement monitoring systems to attempt to prevent such content reaching these audiences (e.g., by blocking the content). For example, some systems may train models using data annotated by volunteers in the community and the results are verified by human agents of an online platform (e.g., PayPal™). Such training methods cause a model to identify and block certain types of online content prior to the content being viewed by various end users. While such methods often provide satisfactory results in terms of blocking content, there are various limitations associated with blocking content altogether. Many existing approaches are able to detect and reject inappropriate content and the 'inappropriate' content is directly discarded. In certain scenarios, there may be reasons to retain these materials if there is other useful information shown in them. For example, if a person that is located in a public swimming pool is holding their identifier (ID) card in front of camera for verification of their identity with an online platform, people located behind the person at the public pool may be wearing attire that certain audiences might deem inappropriate or prefer not to view. As such, in this example, either the content in the image at the public pool may be undesirably shown to end users of the online platform or the system may reject the ID card image altogether (which may result in failure of the identity verification).

BRIEF DESCRIPTION OF THE DRAWINGS

FIG. 5 is a diagram illustrating examples of an original image, a binary image, and several altered images, according to some embodiments.

FIG. 6 is a flow diagram illustrating a method for generating altered media for display in place of original media, according to some embodiments.

DETAILED DESCRIPTION

Figure 1:
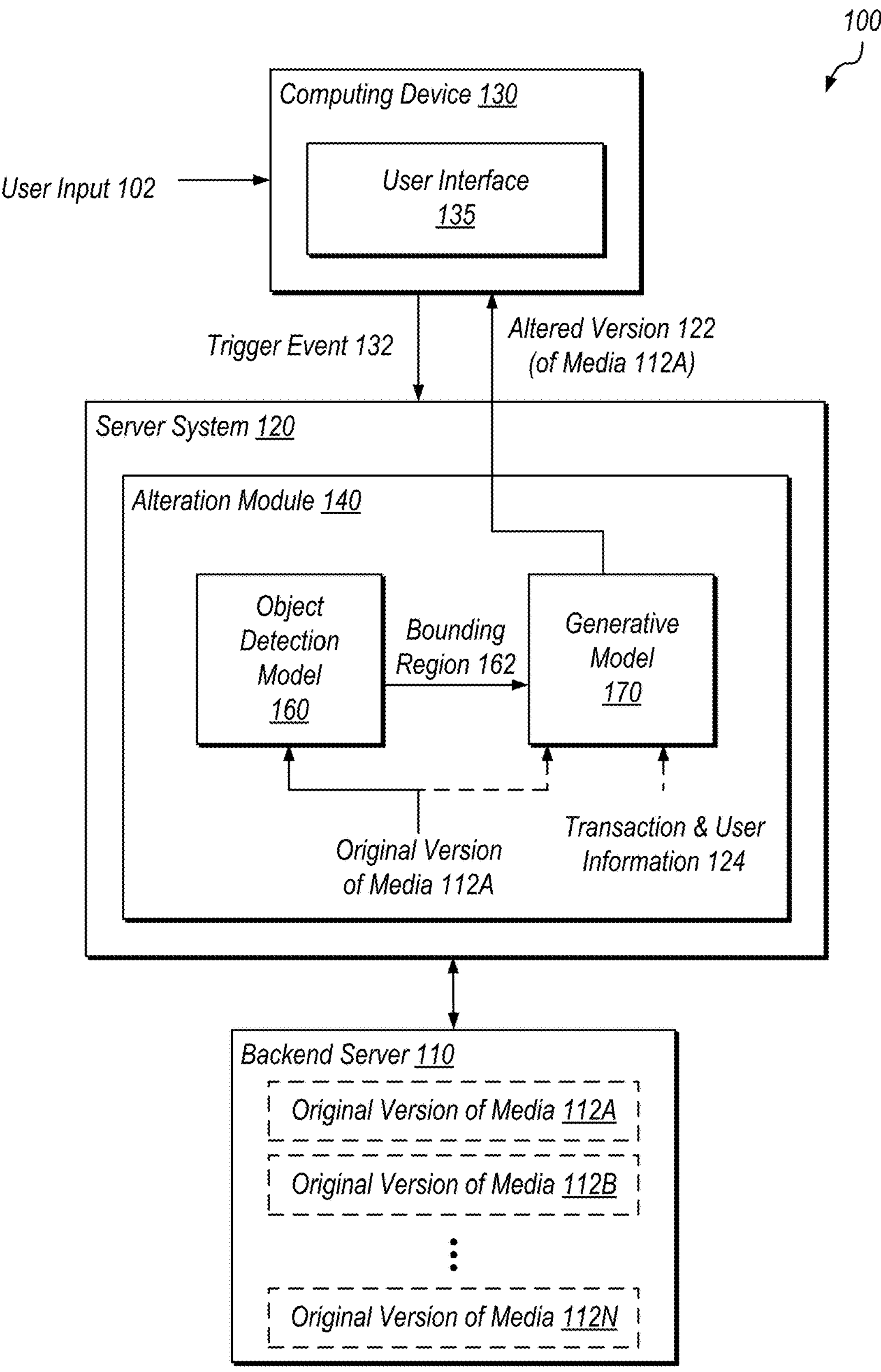
FIG. 1 is a block diagram illustrating an example system configured to generate an altered version of media for display at a user interface of a computing device in place of an original version of the media, according to some embodiments.

Techniques are disclosed for altering an original version of media before it is displayed to a user who requested to view the media, which may include changing the media by adding to, removing from, obscuring, etc. a portion of the media. For example, if a child requests to view an image of a wrist watch, but the original image of the wrist watch shows a model wearing an adult wrist watch, the disclosed generative system will alter the image to display a child's wrist watch on the model in the image by adding or overlaying a child's wrist watch over the adult wrist watch in the original version of the image prior to displaying the image to the child. In this example, after generating an altered version of the image by adding the overlay of the child's wrist watch on the original image, the disclosed system causes the altered version of the image to be displayed to the user instead of the original version of the image.

Traditionally, systems often display an original version of media to an end user at the time that the end user requests to view the media. Such techniques, however, often lead to end users seeing media that they are not interested in, media that includes content that may be inappropriate for some users, media that includes content that is offensive to certain users, etc. In other situations, traditional systems may reject media altogether when an end user requests to view an image. For example, traditional systems may determine not to display an image to a user in response to the user's request due to the image including inappropriate content. This may be especially problematic when an image includes both important content as well as inappropriate content. For example, if an end user uploads an image of their driver's license, but the image includes content in the background (behind the driver's license) that is inappropriate for some audiences, traditional systems may reject the image and the image is not successfully uploaded to the system (e.g., and, thus, the user is not able to be verified via their driver's license). Using disclosed techniques, however, the image of the user's driver's license may be automatically altered in real-time with the upload request such that the inappropriate content in the background is either masked or altered in some way. In this way, the altered image, generated via disclosed techniques, that is uploaded by the user for verification purposes is generally deemed appropriate for most audiences.

To address these shortcomings, the disclosed techniques first detect that media is being requested by end users by placing a proxy server between end user devices and a backend server that stores and retrieves original versions of media for display at the end user devices. The proxy server identifies when an end user device requests media for display to the user (e.g., when the user clicks a link in their web browser, enters a search query in a search element in their user interface, scrolls within a webpage, opens an application on their device, etc.). In response to identifying that a user has requested to view media, the proxy server retrieves an original version of the media from the backend server and identifies whether the media includes one or more customizable portions for alteration (e.g., the system identifies whether the image includes content that is inappropriate for certain audiences). The proxy server identifies portions for alteration using a classification machine learning model trained on prior labeled media. The proxy server then executes an object detection model to identify the bounding regions of the alterable portion(s).

After identifying the bounding regions, the object detection model outputs a black and white image, where the white portion represents the alterable portion of the media encompassed by the identified bounding regions and the black portion of the black and white image represents the rest of the media (which does not require alteration). The proxy server then executes a generative model (such as a stable diffusion model) which receives the original media, user demographics (of the user requesting the media), historical browsing and/or transaction information (of the user requesting the media) as input. The generative model outputs a newly generated, altered media that "masks" or alters the alterable portion of the original version of the media identified by the object detection model. The proxy server then transmits the altered version of the media to the end user device that requested the media, for display at a user interface of the user device instead of the original version of the media.

In some situations, the disclosed techniques may improve overall user experience by adaptively altering and editing media in real-time (e.g., immediately following a user requesting to view the media) depending on which user that will be viewing the media. Alteration of media in a real-time manner may advantageously provide more accurate, up-to-date personalized versions of media to various end users relative to techniques which simply show the same original media to different end users. Real-time media personalization often results in improved user engagement with the media. For example, the disclosed techniques cater the adaptation of media based on the user requesting to view the media. The disclosed techniques may account for whether the image will be viewed by a child, teenager, or adult, whether the image will be viewed by a user that has particular content type preferences (e.g., clothing styles), whether the image will be viewed by a user that is located in a country that places restrictions on types of content allowed to be viewed online, etc. In addition, the disclosed techniques cache altered media for repeated use for users having similar information (e.g., similar search history and demographics), which may advantageously decrease time-to-view for end users as well as decrease computational resources needed to generate altered media.

Example Generative System

FIG. 1 is a block diagram illustrating an example server system configured to generate an altered version of media for display at a user interface of a computing device in place of an original version of the media. In the illustrated embodiment, system 100 includes backend server 110, computing device 130, and server system 120, which in turn includes alteration module 140.

Computing device 130, in the illustrated embodiment, receives user input 102 from an end user via user interface 135. In some embodiments, the user input 102 is a request to view media. For example, while the end user is viewing a webpage displayed via user interface 135, the user clicks on a link included in the webpage to view an image. In this example, the image may be of an item, such as an item of clothing that the end user is interested in purchasing. As another example, the end user may be viewing various video media at a streaming service website displayed via user interface 135. In this example, the user may click on a particular movie they would like to watch via their computing device 130. As another example, a user may enter a uniform resource locator (URL)_into their web browser in order to view a given webpage. In this example, an embedded script (e.g., embedded via JavaScript) sends a request to a backend server requesting to access images to render at the given webpage. The request submitted by the embedded script is one example of a trigger event 132 (discussed in further detail below) caused by a user action (e.g., entering a URL).

Server system 120, in the illustrated embodiment, detects a trigger event 132 at computing device 130. For example, the trigger event 132 detected by server system 120 may be the end user clicking on a link or a video displayed via user interface 135, as discussed above. In other situations, the trigger event 132 is detected by server system 120 when a user provides input 102, such as opening an application on their computing device 130, entering a uniform resource locator (URL) in a browser on their device 130, or viewing any of various information displayed on device 130 via user interface 135. In response to detecting a trigger event 132, server system 120 retrieves an original version of the media 112A associated with the trigger event 132 from backend server 110. In some embodiments, backend server 110 stores a plurality of original versions of media 112A-112N in a database. For example, server system 120 may be a proxy server that interacts with both a plurality of end user computing devices and a backend server 110. In this example, server system intercepts requests for media content sent from the plurality of computing devices to the backend server 110 and alters the media prior to providing the requested media to the respective computing devices. After retrieving the original version of media 112A, server system 120 executes alteration module 140 and generative model 170 to generate an altered version 122 of the media 112A associated with user input 102.

Alteration module 140, in the illustrated embodiment, inputs an original version of media 112A into object detection model 160. Object detection model 160 identifies a bounding region 162 of a portion of content within original version of media 112A. Based on identifying the bounding region 162, object detection model 160 transmits the bounding region to generative model 170. In some embodiments, object detection model 160 is a computer vision model that detects an area within the media occupied by a particular portion of content. In some embodiments, object detection model 160 outputs a masked image that shows the bounding region of the original image in a first color and the rest of the original image in a second, different color. For example, as discussed in further detail below with reference to FIG. 5, object detection model 160 may output a black and white image with the identified customizable portion shown in white and the rest of the image shown in black. In some embodiments, the particular portion of the content shown in the original version of media 112A is one that has been determined to be customizable for one or more users as discussed in further detail below with reference to FIG. 3. For example, the portion of content within the media 112A may be altered by alteration module 140 to customize the content for a user requesting to view the media prior to the media being displayed to the user. In some embodiments, the portion of the content shown in the original version of media 112A is associated with one or more limitations. For example, the content may be age-specific (e.g., inappropriate for one or more users), geographic-specific, demographic-specific, etc.

Generative model 170, in the illustrated embodiment, receives bounding region 162 from object detection model 160. In addition, in some embodiments, alteration module 140 inputs the original version of media 112A and transaction and user information 124 into generative model 170.

The transaction information may include historical data associated with a plurality of transactions initiated by the user of computing device 130. For example, the transaction information includes transaction amounts, transaction types, accounts involved in the transactions, transaction dates, browsing information (e.g., a list of items, products, etc. viewed or purchased by the user), etc. Similarly, the user information may include information about the user associated with computing device 130, such as: geographic location (e.g., the residential address of the user), age, gender, ethnicity, marital status, employment, income, etc. Based on these inputs, generative model 170 generates an altered version 122 of media 112A. For example, if server system 120 inputs an image of a person holding a video game console (e.g., a Nintendo Switch™), but the transaction and browsing information of a user indicate that this user prefers art supplies to video games, generative model 170 will take a bounding region of the video game console within the image and replace or overlay this portion of the image with a drawing table (e.g., an iPad™).

In various situations, generative model 170 generates different altered versions of media 112A for two different users. For example, a first altered version replaces the apple with a pineapple based on the first user preferring pineapples, while a second altered version replaces the apple with a pear based on the second user preferring pears. In some embodiments, generative model 170 is a deep learning machine learning model. For example, generative model may be a stable diffusion model trained to receive at least a text description as input and, based on the text, output an image. As discussed in further detail below with reference to FIG. 4, alteration module 140 trains generative model 170 based on labels assigned to various media by a plurality of agents as well as transaction and browsing information of different users. Server system 120, in the illustrated embodiment, transmits the altered version 122 of media 112A to computing device 130 for display via user interface 135 in place of the original version of media 112A associated with the trigger event 132.

In this disclosure, various "modules" operable to perform designated functions are shown in the figures and described in detail (e.g., alteration module 140, decision module 390, training module 410, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized application-specific integrated circuit (ASIC) [ASIC].

Example Alteration Module Method

Figure 2:
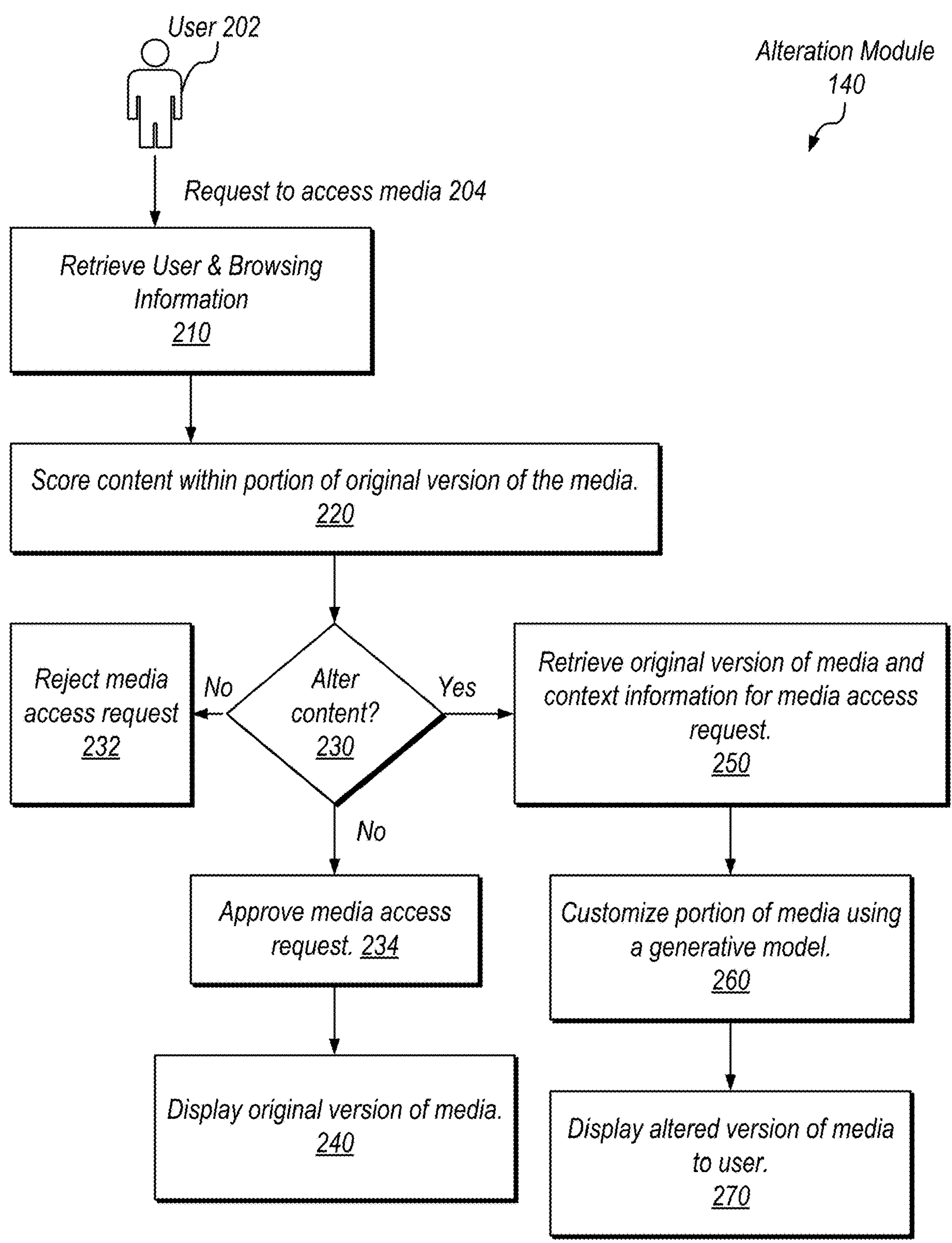
FIG. 2 is a flow diagram illustrating an example method for determining whether to alter requested media, according to some embodiments.

Turning now to FIG. 2, a flow diagram is shown illustrating an example method for determining whether to alter requested media, according to some embodiments. The method shown in FIG. 2 is implemented by alteration module 140, which in turn is executed by server system 120, shown in FIG. 1. In various embodiments, some of the method elements shown may be performed concurrently, in a different order than shown, or may be omitted. Additional method elements may also be performed as desired.

In the illustrated embodiment, a user 202 requests to access media 204. At element 210, alteration module 140 retrieves user and browsing information based on the request to access media 204. As discussed above with reference to FIG. 1, the browsing information may include a history of items, products, services, etc. previously interacted with (e.g., viewed by, selected, purchased, etc.) by user 202. Further, the user information may include user demographic information. For example, as discussed above with reference to FIG. 1, user demographic information may include geographic location, age, gender, etc.

At element 220, in the illustrated embodiment, alteration module 140 scores the content within the portion of the original version of the media 204 that user 202 requested to access. For example, as discussed in further detail below with reference to FIG. 3, alteration module may execute a model to determine whether to alter content of requested media 204. The scoring performed at 220 may be based on the user information, the browsing information, the type of content displayed within the requested media 204, etc. As discussed in further detail below, the scoring may be performed using a machine learning model (e.g., classifications predicted by the model on a scale of 0 to 1). In other situations, the scoring may be performed using a set of predetermined rules (e.g., if the media includes a person, then add 5 points to the score, but if the media includes inappropriate content, then add 20 points to the score).

At element 230, alteration module 140 determines, based on the score generated at element 220, whether to alter content in the media. In some embodiments, alteration module 140 compares the score with one or more scoring thresholds. For example, if the score is below a first score threshold, alteration module 140 determines, at element 230, not to alter the media and the method proceeds to element 234, where alteration module approves the media access request at element 234. Once alteration module 140 has approved the requested media at element 234, server system 120 causes the original version of the requested media 204 to be displayed to the user. Further in this example, if the score is above the first threshold, but below a second score threshold, alteration module 140 determines, at element 230, to alter the requested media 204 and the method proceeds to element 250. If, however, the score is above the second score threshold, alteration module 140 rejects the request for media at element 232 and the media is not displayed to the user 202 at all.

At element 250, after determining to alter content of the media, alteration module 140 retrieves the original version of media and content information for the request to access media 204. For example, the context information may indicate actions of the user 202 prior to submitting the request to access media 204, such as browsing activity of the user on a webpage at which they submitted the request (e.g., scrolling activity of the user on a webpage before the user clicks a link to view an image), one or more applications accessed by the user 202 on their device prior to submitting the request (e.g., a payment provider application to check a status of an account), information associated with the request itself (e.g., an entity or business associated with the request, the type of content to be displayed in the requested media, etc.), a geolocation of the user 202 prior to submitting the request, purchase history, items in shopping cart, etc. At element 260, alteration module 140 customizes a portion of media 204 using a generative model as discussed in further detail below with reference to FIG. 3. At element 270, after customizing media 204, alteration module 140 causes the altered version of the media to be displayed to user 202 via a user interface of their device.

Example Media Generation

Figure 3:
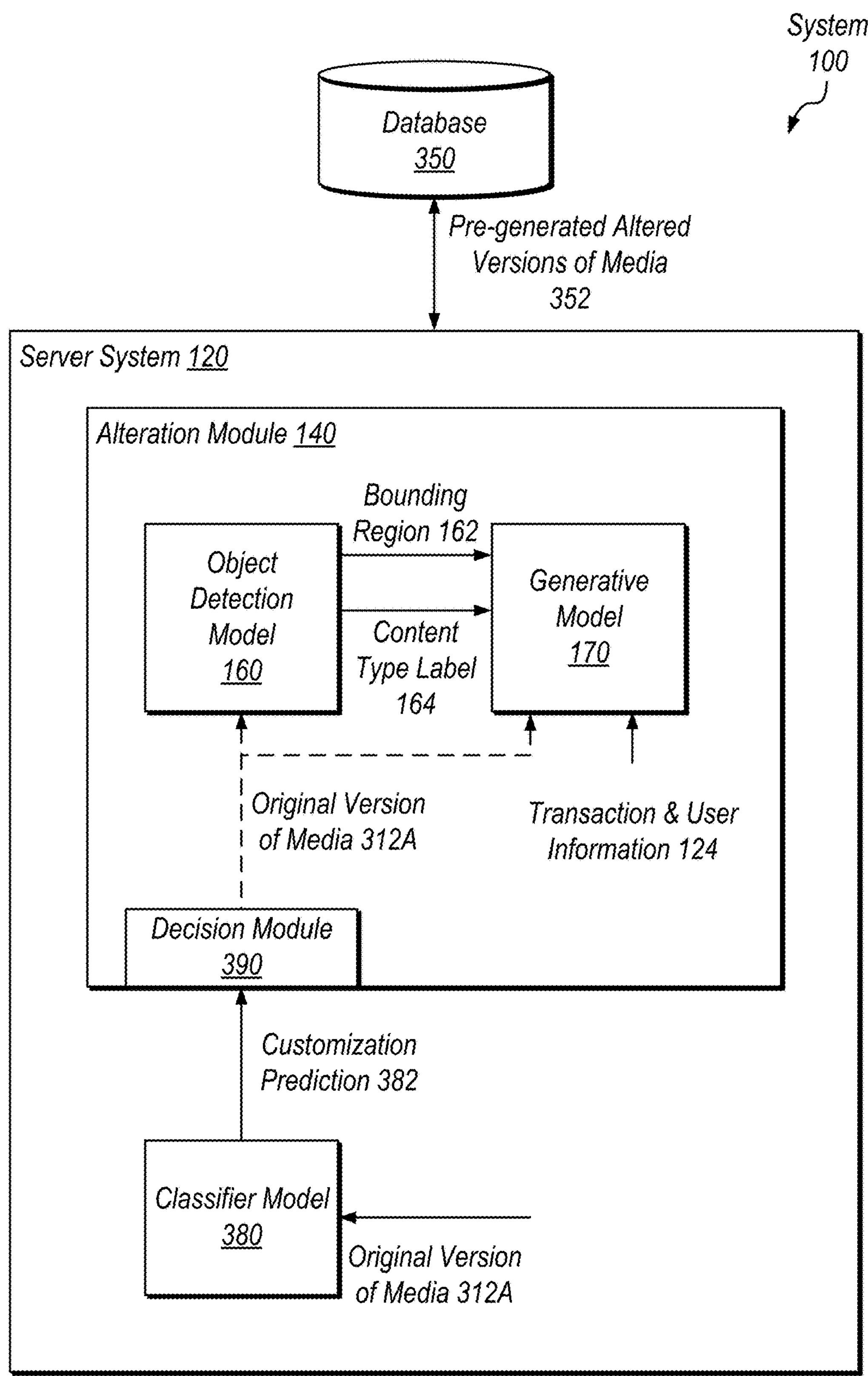
FIG. 3 is a block diagram illustrating an example system configured to pre-generate altered versions of media, according to some embodiments.

FIG. 3 is a block diagram illustrating an example system configured to pre-generate altered versions of media. In the illustrated embodiment, system 100 includes database 350 and server system 120, which in turn includes alteration module 140 and classifier model 380. Alteration module 140, in the illustrated embodiment, includes object detection model 160, generative model 170, and decision module 390.

In some embodiments, server system is configured to pre-generate altered versions of media. As used herein, the term "pre-generating" is intended to be construed according to its well-understood meaning, which includes generating something prior to a given event. For example, pre-generating altered media includes generating altered media prior to receiving a request, from a user, to access an original version of the media. In order to pre-generate altered media, server system 120 retrieves original versions of different media stored by backend server 110 (shown in FIG. 1) and pre-generates altered versions of the media via alteration module 140. In the illustrated embodiment, after altering the media retrieved from backend server 110, server system 120 stores the pre-generated altered versions 352 of media in database 350. Server system 120 performs the retrieval, pre-generation, and storage of pre-generated altered media prior to detecting one or more requests to access original versions of the media.

In some embodiments, server system 120 executes a classifier model 380 to determine whether to alter media at all. Server system may execute classifier model 380 both when pre-generating altered media or when generating altered media real-time with (i.e., immediately following) a user request for media. For example, in some situations server system determines not to alter media. Classifier model 380, in the illustrated embodiment, is executed by server system 120 to determine whether to customize (i.e., alter) an original version of media 312A that a user has requested to access. In some embodiments, classifier model 380 is a machine learning classifier, trained to predict whether media should be altered. For example, as discussed in further detail below with reference to FIG. 4A, server system 120 may train classifier model 380 to identify whether media includes content that is customizable and associated with one or more limitations (e.g., content that may be inappropriate for one or more audiences). Classifier model 380, in the illustrated embodiment, outputs a customization prediction 382 indicating whether the media 312A includes content that is customizable.

Decision module 390, in the illustrated embodiment, receives customization prediction 382 from classifier model 380 and decides whether to alter an original version of media 312A based on the prediction. The customization prediction 382 output by classifier model 380 may be a classification score indicating a likelihood that media 312A includes customizable content. As one example, a classification score output by classifier model 380 is a value between 0 and 1, with values closer to 1 indicating that the media 312A includes customizable content and values closer to 0 indicating that the media 312A does not include customizable content. As another example and as discussed above with reference to FIG. 2, decision module 390 may compare the customization prediction 382 (e.g., classification score) received from classifier model 380 with one or more scoring thresholds to make a final determination whether to display an original version of media 312A, an altered version of media 312A, or whether to reject a request for media altogether (i.e., in situations in which the server system 120 is performing real-time alteration of media, the system chooses not to display media to an end user in response to their request).

In some embodiments, based on evaluating the customization predictions 382 received from classifier model 380), decision module 390 determines that the media should be altered and sends the original version of media 312A to object detection model 160 and generative model 170. In other embodiments, based on evaluating the customization predictions 382, decision module 390 determines that media 312A should not be altered and outputs a decision indicating such. In these situations, server system 120 either rejects the request for media or causes the original version of media 312A to be displayed to a user. For example, the decision output by decision module 390 may indicate not to display media 312A at all.

As discussed above with reference to FIG. 1, object detection model 160 and generative model 170 identify bounding regions 162 of customizable content and generate an altered version of media 312A based on the identified bounding regions and the transaction and user information 124 of a user requesting to view the media 312A. In the illustrated embodiment, in addition to outputting a bounding region 162, object detection model 160 outputs a content type label 164 indicting the type of content within bounding region 162. For example, content type label 164 may indicate that one or more types of the following types of content is shown within bounding region 162: customizable item (e.g., clothing item, product, vehicle, etc.), inappropriate content (e.g., nude content, explicit language, inappropriate symbols, etc.), confidential content (e.g., a user identifier, account number, etc.), etc.

In embodiments in which it is pre-generating altered media, server system 120 may generate multiple different altered versions of a given set of media 312A (e.g., a given image) based on transaction and user information 124 from multiple different users. In such embodiments, server system 120 stores the pre-generated, altered versions 352 of media with their corresponding transaction and user information 124. For example, server system 120 stores a given pre-generated altered version 352 of media 312A with the transaction and user information 124 that was used to generate the given altered version 352 of the media. In this way, server system 120 can retrieve the given pre-generated altered version 352 of the media from database 350 in response to a user request to view the original version of media 312A based on comparing the transaction and user information of the user that submitted the request with the transaction and user information stored with a corresponding pre-generated version of media stored in database 350. For example, if the transaction and user information of the user match that stored in database 350, server system 120 retrieves the corresponding pre-generated altered version of the media and causes it to be displayed to the user in response to their request.

Example Model Training

Figure 4A:
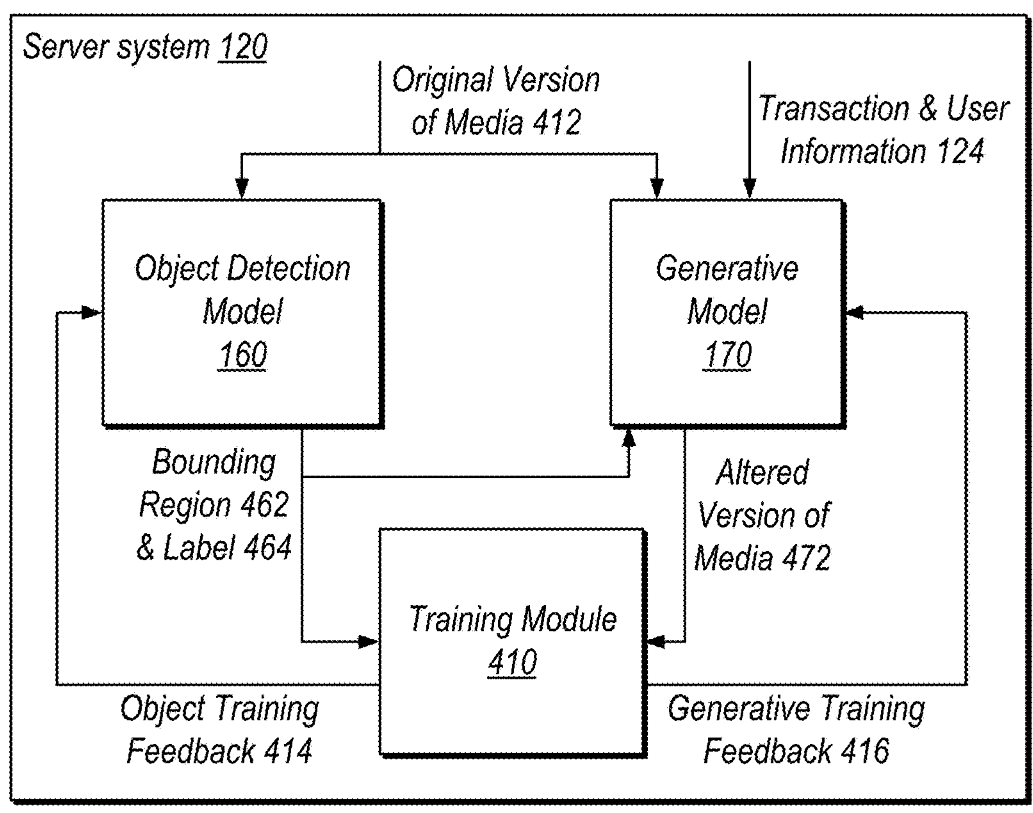
FIGS. 4A and 4B are block diagrams illustrating example model training, according to some embodiments.
Figure 4B:
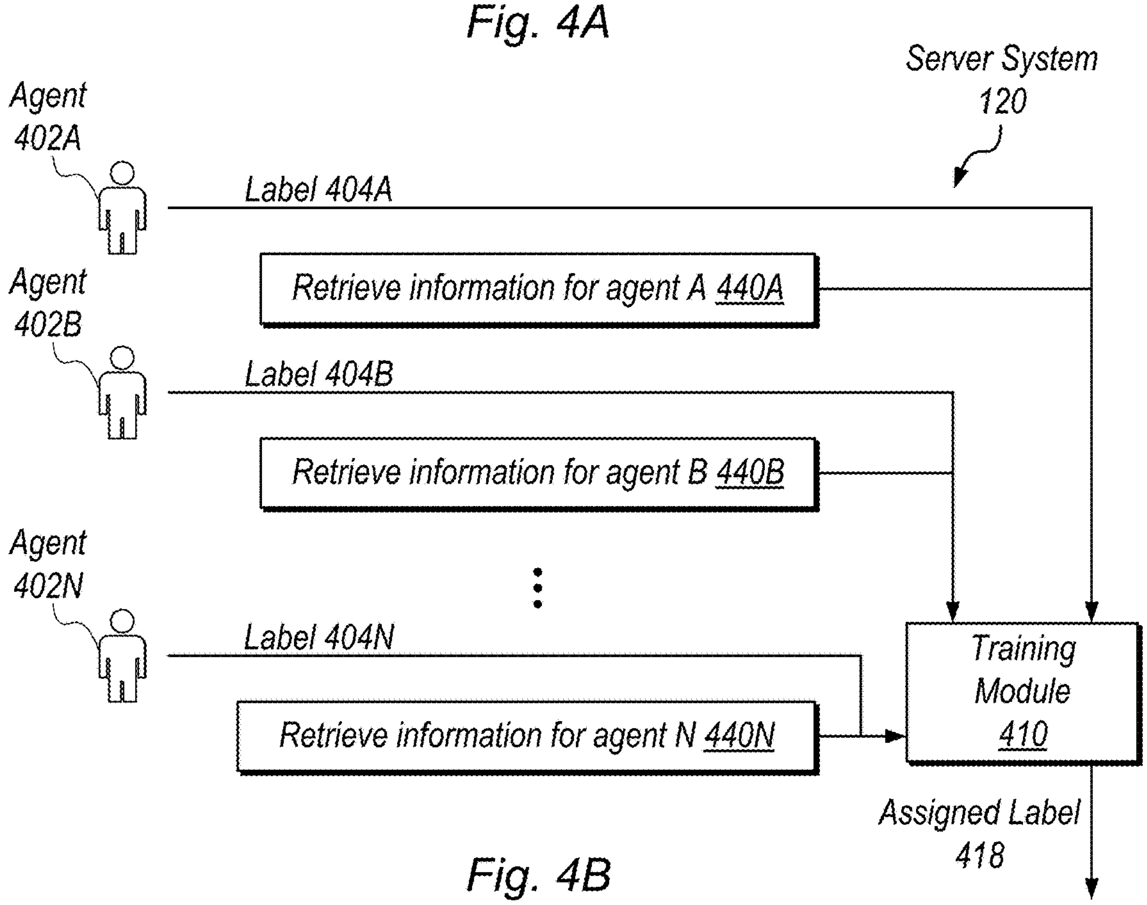

FIGS. 4A and 4B are block diagrams illustrating example model training. In FIG. 4A, server system 120 includes a training module 410 executable to train both object detection model 160 and generative model 170. In the illustrated embodiment, training module 410 trains both the object detection model 160 and the generative model 170 at the same time. In other embodiments, training module 410 trains the two models separately. In some embodiments, training module 410 trains classifier model 380, shown in FIG. 3, in addition to training object detection model 160 and generative model 170.

In FIG. 4A, server system 120 inputs an original version of media 412 into object detection model 160. Training module 410 receives masked media with the portion of the media representing the predicted customizable content being shown in black and the rest of the media being shown in white. The masked media output by object detection model 160 indicates a predicted bounding region 462 of the customizable content. In some embodiments, object detection model 160 outputs a label 464 for the content within the predicted bounding region 462. For example, object detection model 160 may predict that the customizable content includes inappropriate content and will output a label indicating this prediction (e.g., model 160 outputs the label "nude").

Based on comparing the predicted bounding region 462 with a known bounding region of customizable content within media 412 and comparing the label 464 output by model 160 with a known label (assigned by an agent of the server system 120), training module 410 sends object training feedback 414 to object detection model 160. For example, if the predicted bounding region 462 output by object detection model 160 is different than a known bounding region identified by an agent of system 120 more than a threshold amount, then training module 410 will adjust one or more weights of object detection model 160. The altered weights teach the model to accurately identify a bounding region of customizable content within an original version of media 412. Similarly, if the label 464 output by object detection model 160 is different than a labeled assigned by an agent of server system 120, then training module 410 will adjust one or more weights of model 160.

In FIG. 4A, the output of object detection model 160 is input into generative model 170 during training. For example, the predicted bounding region 462 and predicted label 464, as well as an original version of media 412 and transaction and user information 124, are input to generative model 170. As discussed above, the user information may include user demographic information. In addition, the user information may include non-demographic information, such as a security clearance of the user (e.g., to access certain data, such as private user data when this user is providing customer service help), health information of the user, application activity on a device of the user, etc. The transaction and user information 124 are associated with an agent that previously assigned a known label to the customizable content within the original version of media 412. Generative model 170, in the illustrated embodiment, outputs an altered version 472 of media 412. In some embodiments, based on comparing the altered version 472 of the media with an altered version of the media that was generated by the agent that assigned the known label to the customizable content, training module 410 sends generative training feedback 416 to generative model 170. For example, if the model-generated altered media is different than an altered version of media generated by an agent, then training module 410 will continue to train generative model 170 e.g., until it satisfies one or more training metrics. In other embodiments training module 410 requests feedback for the altered version 472 of media 412 output by generative model 170 from the agent that assigned the known label to media 412. In such embodiments, based on the feedback from the agent, training module 410 sends generative training feedback 416 to generative model 170. For example, the generative training feedback 416 includes one or more adjusted weights for the generative model (e.g., a stable diffusion model).

In some embodiments, the disclosed training techniques use labels and input from a plurality of different agents. For example, training object detection model 160 and generative model 170 based on input from an agent having a particular set of transaction and user information allows the trained versions of these models to provide appropriately altered media to end users having similar transaction and user information to the agent. During training, the models learn a relationship between certain transaction and user information and certain types of media alterations. In order to teach object detection model 160 and generative model 170 such relationships, server system 120 inputs agents' transaction and user information 124 into the models during training, but inputs end users' transaction and user information into the models during inference, as discussed in further detail below with reference to FIG. 4B.

In FIG. 4B, server system 120 gathers labels 404A-404N and agent information 440A-440N from a plurality of agents 402A-402N. In the illustrated embodiment, server system 120 obtains a label 404A from agent 402A indicating a portion of an original version of media (e.g., an image) includes content that is inappropriate for users of a certain agent information (e.g., users with similar demographic or shopping preferences as the agent). Server system 120 inputs the gathered labels and their corresponding agent information into training module 410 for use in training object detection model 160 and generative model 170.

In the illustrated embodiment, based on labels 404A-404N received from a plurality of different agents 402A-402N for a given original version of media 412, training module 410 determines and assigns a final label 418 to the given original version of media 412. For example, agent 402A and agent 402B have similar agent information 440A and 440B and these agents assign a first (the same) label to media 412, but a third agent 402C having different agent information 440C than the first two agents assigns a second, different label to media 412. Based on these labels, training module 410 assigns the first label to media 412, to be input during training into models 160 and 170 with agent information 440A and 440B. In contrast, training module 410 may also assign the second, different label to a second instance of media 412 to be input during training into models 160 and 170 with agent information 440C. In this way, training module 410 may advantageously train models to identify a relationship between users with similar information to an agent's information in that the users and the agent are likely to identify the same type of media content as "inappropriate," "stylish," "outdated," etc. For example, users and agents having similar information and transaction history are likely to want to view the same or similar types of media content. As such, the training performed by training module 410 in FIGS. 4A and 4B teaches models 160 and 170 to identify a relationship between transaction and user information and certain types of media content.

As discussed above, in addition to training object detection model 160 and generative model 170, server system 120 may train the classifier model 380 shown in FIG. 3. For example, server system 120 inputs labeled media into classifier model 380 and, based on customization predictions 382 output by model 380, training module 410 sends classifier feedback to model 380. The classifier feedback may include, for example, adjusted weights for the machine learning classifier model 380. For example, if classifier model 380 predicts that an image should not be altered but the label for this image indicates that it includes customizable content (e.g., a t-shirt that could be shown in different colors), then training module 410 will adjust the weights of classifier model 380 so that it is more likely to identify the customizable content in the image.

Example Images

Turning now to FIG. 5, a diagram is shown illustrating examples of an original image, a binary image, and several altered images. In the illustrated embodiment, an example original image 500 is shown, an example binary image 502 of the original image 500 is shown, and several example altered images 504 are shown. In the illustrated embodiment, original image 500 includes a person (a clothing model) wearing black pants and a striped black and white shirt with black sleeves standing in front of a white background. Example binary image 502 is one example of binary images that object detection model 160 may generate to represent the bounding regions of image content associated with one or more limitations. Binary image 502 represents the t-shirt worn by the model in original image 500 using white, while the rest of the original image 500 is represented using the color black. In this example, the white portion of binary image 502 indicates the portion of the original image 500 to be altered.

In the illustrated embodiment, altered image 504A shows that the t-shirt of the model has been changed to a solid black t-shirt to match the pants of the model, altered image 504B shows that the t-shirt of the model has been changed to a gray color, altered image 504C shows that the t-shirt of the model has been changed to a checkered pattern, and altered image 504D shows that the t-shirt of the model has been changed to a striped pattern. For example, altered image 504A is generated by alteration module 140 (shown in FIG. 1) for a user located in a geographical location (e.g., a town, city, or country) in which individuals generally wear dark-colored clothing (e.g., due to their local climate determined based on their user information 124). As another example, altered image 504B is generated by alteration module 140 for a user that generally shops for gray-colored clothing (indicated by their transaction history). In a further example, alteration module 140 generates altered image 504C and altered image 504D for two different users that generally shop for patterned clothing and striped clothing, respectively. In other situations, decision module 390 (shown in FIG. 3) may decide not to generate an altered image for a given user and instead, server system 120 sends the original image 500 to be displayed to the given user in response to the user requesting to view an image of a t-shirt.

In some situations, if the item of clothing being displayed in an image is a swimsuit, the disclosed generative model 170 may alter the swimsuit displayed on a person (such as the model shown in image 500) based on the age, geographic location, and shopping preferences of the end user viewing the swimsuit. For example, a first user that is located in southern California, is a woman, and has a browsing history of viewing adult swimsuits. Based on this transaction history and user information, the disclosed generative model will generate an altered image of a person that is wearing an adult, two-piece swimsuit with a sun hat (the original image showed a person wearing a one-piece swimsuit without a hat). As another example, a second, different user that is located in northern California, is a child, and has a browsing history of viewing surfing wetsuits, the disclosed generative model will generate an altered image of a child that is wearing wetsuits designed for cold climates (e.g., the original image showed a child wearing a one-piece swimsuit designed for swim team races). In some situations, the disclosed techniques replace a product (e.g., an adult swimsuit) shown in a requested image of a given merchant with a different product (e.g., a child's swimsuit) of the given merchant.

Example Method

FIG. 6 is a flow diagram illustrating a method for generating altered media for display in place of original media, according to some embodiments. The method 600 shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, server system 120 performs the elements of method 600.

At 610, in the illustrated embodiment, a server system detects at a computing device, a trigger event indicating that a user of the computing device has requested to view media at a user interface of the computing device. In some embodiments, the server system is a proxy server configured to monitor communication between a plurality of user devices and the backend server storing media content requested by and displayable at the plurality of user devices, where the portion of content within the original version of the media is content associated with one or more limitations. For example, the portion of content associated with one or more limitations is associated with one or more of the following limitations: user age, user demographics, user geographic location, etc. In some embodiments, the trigger event is selection, by the user, of a link displayed within a current webpage at the user interface of the computing device, where the selection of the link redirects the user to a new webpage that includes the original version of the media, and where the original version of the media is an image.

At 620, in response to detecting the trigger event, the server system retrieves an original version of the media indicated by the trigger event from a backend server. In some embodiments, server system 120 executes alteration module 140 to retrieve the original version of the media from backend server 110 as discussed above with reference to FIG. 1. In some embodiments, prior to detecting the trigger event indicating that the user of the computing device has request to view the media, the server system generates, using the generative model, a plurality of altered versions of the media, where the generative model generates the plurality of altered versions of the media based on a plurality of different sets of historical transaction and user information of a plurality of different users. In some embodiments, prior to detecting the trigger event indicating that the user of the computing device has request to view the media, the server system stores the plurality of altered versions of the media with their respective corresponding sets of historical transaction and user information in a backend database. In some embodiments, further in response to detecting the trigger event, the server system retrieves, from the backend database, one or more of the plurality of altered versions of the media, where the retrieving is performed based on comparing the historical transaction and user information of the user of the computing device with the plurality of different sets of historical transaction and user information stored in the backend database. For example, in some situations, the server system generates altered media in real-time. In other situations, the server system generates the altered media ahead of detecting one or more trigger events.

At 630, in response to detecting the trigger event, the server system identifies, using an object detection model, a bounding region of a portion of content within the original version of the media. For example, server system 120 executes object detection model 160 to identify the bounding region as discussed above with reference to FIG. 1. In some embodiments, the server system performs the identifying by determining, using a classifier model, whether the original version of the media includes a portion of content that is customizable for one or more users. In some embodiments, identifying the bounding region of the portion of content includes identifying both a position of the portion of content within the original version of the media and a shape of the portion of the content, where output of the object detection model is a binary version of the original media showing the identified bounding region of the portion of the content as one color and portions of the original media that are not included in the identified bounding region as another color. In some embodiments, the binary version of the original media is a black and white image, where the white represents the content associated with one or more limitations and the black represents the rest of the content in the original image.

At 640, in response to detecting the trigger event, the server system generates, using a generative model, an altered version of the media based on the identified bounding region, where the generative model generates the altered version of the media based on historical transaction information and user information of the user of the computing device. For example, server system 120 executes generative model 170 to generate the altered version of the media as discussed above with reference to FIG. 1. In some embodiments, the user information of the user of the computing device includes one or more types of the following types of demographic information: age, geographic location, gender, employment, and income. In some embodiments, the generative model is a stable diffusion model, where the stable diffusion model further generates the altered version of the media based on receiving the original version of the media as input, and where the altered version of the media output by the generative model includes added content masking original content included within the bounding region of the original version of the media identified by the object detection model. In other embodiments, the added content replaces the portion of original content in the media. In some embodiments, the server system trains the generative model by inputting different labeled media and user information of an agent that assigns labels to the different labeled media, comparing output of the generative model with known labels for the different labeled media provided by the agent, and adjusting one or more weights of the generative model based on the comparing.

At 650, in response to detecting the trigger event, the server system transmits the altered version of the media to the computing device for display at the user interface of the computing device in place of the original version of the media. For example, server system 120 transmits altered version 122 of media 112A to computing device 130 to be displayed by the device via user interface 135, as discussed above with reference to FIG. 1. In some embodiments, the server system detects another trigger event indicating that the user of the computing device has request to view an image at the user interface of the computing device. In some embodiments, the server system retrieves an original version of the image from the backend server. In some embodiments, in response to identifying, using a classifier model that the image does not include content associated with one or more limitations, the server system transmits the original version of the image to the computing device for display at the user interface.

Example Computing Device

Figure 7:
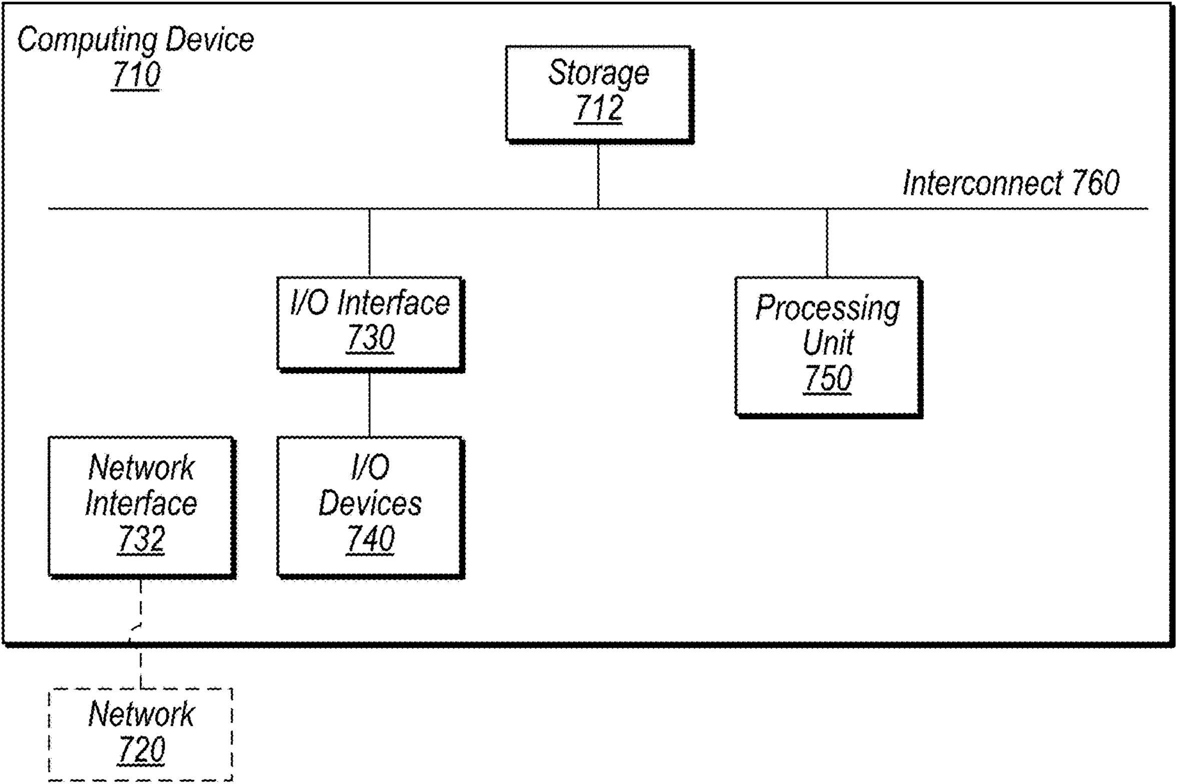
FIG. 7 is a block diagram illustrating an example computing device, according to some embodiments.

Turning now to FIG. 7, a block diagram of one embodiment of computing device 710 (which may also be referred to as a computing system) is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. The server system 120, computing device 130, and backend server 110, shown in FIG. 1 and discussed above, are different examples of computing device 710. As shown in FIG. 7, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Database 350, discussed above with reference to FIG. 3 is an example of storage subsystem 712. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

detecting, by a server system at a computing device, a trigger event indicating that a user of the computing device has requested to view media at a user interface of the computing device;

in response to and in real-time with detecting the trigger event:

retrieving, by the server system from a backend server, an original version of the media indicated by the trigger event;

identifying, by the server system using an object detection model, a bounding region of a portion of content within the original version of the media;

generating, by the server system using a generative model, an altered version of the original version of the media based on the identified bounding region, wherein the generative model generates the altered version of the media based on historical transaction information and user information of the user of the computing device; and transmitting, by the server system to the computing device, the altered version of the media for display at the user interface of the computing device in place instead of transmitting the original version of the media.

2. The method of claim 1, wherein the identifying is performed based on: determining, using a classifier model, whether the original version of the media includes a portion of content that is customizable for one or more users.

3. The method of claim 2, wherein the server system is a proxy server configured to monitor communication between a plurality of user devices and the backend server storing media content requested by and displayable at the plurality of user devices, and wherein the portion of content within the original version of the media that is customizable is content associated with one or more limitations.

4. The method of claim 1, wherein the generative model is a stable diffusion model, wherein the stable diffusion model further generates the altered version of the media based on receiving the original version of the media as input, and wherein the altered version of the media output by the generative model includes added content masking original content included within the bounding region of the original version of the media identified by the object detection model.

5. The method of claim 1, further comprising, training the generative model, including:

inputting, by the server system into the generative model, different labeled media and user information of an agent that assigns labels to the different labeled media;

comparing, by the server system, output of the generative model with known labels for the different labeled media provided by the agent; and adjusting, by the server system based on the comparing, one or more weights of the generative model.

6. The method of claim 1, wherein identifying the bounding region of the portion of content includes identifying both a position of the portion of content within the original version of the media and a shape of the portion of the content, and wherein output of the object detection model is a binary version of the original media showing the identified bounding region of the portion of the content as one color and portions of the original media that are not included in the identified bounding region as another color.

7. The method of claim 1, further comprising:

detecting, by the server system at the computing device, another trigger event indicating that the user of the computing device has requested to view an image at the user interface of the computing device;

retrieving, by the server system from the backend server, the original version of the image; and in response to identifying, by the server system using a classifier model, that the image does not include content associated with one or more limitations, transmitting the original version of the image to the computing device for display at the user interface.

8. The method of claim 1, further comprising, prior to detecting the trigger event indicating that the user of the computing device has requested to view the media:

generating, by the server system using the generative model, a plurality of altered versions of the media, wherein the generative model generates the plurality of altered versions of the media based on a plurality of different sets of historical transaction and user information of a plurality of different users; and storing, by the server system at a backend database, the plurality of altered versions of the media with their respective corresponding sets of historical transaction and user information.

9. The method of claim 8, wherein further in response to detecting the trigger event:

retrieving, by the server system from the backend database, one or more of the plurality of altered versions of the media, wherein the retrieving is performed based on comparing the historical transaction and user information of the user of the computing device with the plurality of different sets of historical transaction and user information stored in the backend database.

10. A non-transitory computer-readable medium having instructions stored thereon that are executable by a proxy server system to perform operations comprising:

receiving, from a computing device, a request for an image to be displayed at a user interface of the computing device;

in response to receiving the request and prior to the image indicated in the request being displayed at the interface of the computing device:

retrieving an original version of the image indicated in the request from a backend server;

determining, using a classifier model, whether the original version of the image includes a portion that is customizable for one or more users;

in response to determining that the original version of the image includes the portion that is customizable, identifying, using an object detection model, a bounding region of the portion of the image that is customizable;

generating, using a stable diffusion model, an altered version of the original version of the image based on the identified bounding region, wherein the stable diffusion model generates the altered version of the image based on the original version of the image and historical browsing information of a user of the computing device; and transmitting, to the computing device, the altered version of the image for display at the user interface of the computing device in place of the original version of the image.

11. The non-transitory computer-readable medium of claim 10, wherein the stable diffusion model further generates the altered version of the image based on demographic information of the user.

12. The non-transitory computer-readable medium of claim 11, wherein the historical browsing information of the user of the computing device includes one or more types of the following types of information: age, geographic location, gender, employment, and income.

13. The non-transitory computer-readable medium of claim 10, wherein the server system is a proxy server configured to monitor communication between a plurality of user devices and a source server storing media content requested by and displayable at the plurality of user devices, and wherein the portion of content within the original version of the media is content associated with one or more limitations.

14. The non-transitory computer-readable medium of claim 10, wherein the altered version of the image output by the stable diffusion model includes added content that masks original content included within the bounding region of the original version of the image identified by the object detection model.

15. The non-transitory computer-readable medium of claim 10, wherein identifying the bounding region of the portion of content includes identifying both a position of the portion of content within the original version of the image and size of the portion of the content, and wherein output of the object detection model is a binary version of the original version of the image showing the identified bounding region of the portion of the content as a first color and portions of the original media that are not included in the identified bounding region of the original version of the image as a second, different color.

16. A system, comprising:

a processor; and a non-transitory computer-readable medium having stored thereon instructions that are executable by the processor to cause the system to perform operations comprising:

detecting, at a computing device, a trigger event indicating that a user of the computing device has requested to view media at a user interface of the computing device;

in response to and in real-time with detecting the trigger event:

retrieving, from a backend server, an original version of the media indicated by the trigger event;

identifying, using an object detection model, a bounding region of a portion of content within the original version of the media;

generating, using a generative model, an altered version of the original version of the media based on the identified bounding region, wherein the generative model generates the altered version of the media based on historical transaction information and demographic information of the user of the computing device; and transmitting, to the computing device, the altered version of the media for display at the user interface of the computing device instead of transmitting the original version of the media.

17. The system of claim 16, wherein the trigger event is selection, by the user, of a link displayed within a current webpage at the user interface of the computing device, wherein the selection of the link redirects the user to a new webpage that includes the original version of the media, and wherein the original version of the media is an image.

18. The system of claim 16, wherein the identifying is performed based on: determining, using a classifier model, whether the original version of the media includes a portion of content that is customizable for one or more users, wherein the portion of content that is customizable includes content associated with one or more limitations.

19. The system of claim 16, wherein the generative model is a stable diffusion model, wherein the stable diffusion model further generates the altered version of the media based on receiving the original version of the media as input, and wherein the altered version of the media output by the generative model includes added content that has been added as a mask over original content included within the bounding region of the original version of the media identified by the object detection model.

20. The system of claim 16, wherein the historical transaction information of the user of the computing device includes one or more types of the following types of transaction information: account information for an account with the system, transaction history, and browsing history.

* * * * *